United States Patent
Segi

(10) Patent No.: US 11,919,456 B2
(45) Date of Patent: Mar. 5, 2024

(54) SOUND ABSORBING AND INSULATING STRUCTURE

(71) Applicant: TOYOTA SHATAI KABUSHIKI KAISHA, Kariya (JP)

(72) Inventor: Makoto Segi, Kariya (JP)

(73) Assignee: TOYOTA SHATAI KABUSHIKI KAISHA, Aichi-ken (JP)

(*) Notice: Subject to any disclaimer, the term of this patent is extended or adjusted under 35 U.S.C. 154(b) by 442 days.

(21) Appl. No.: 17/266,062

(22) PCT Filed: Aug. 1, 2019

(86) PCT No.: PCT/JP2019/030125
§ 371 (c)(1),
(2) Date: Feb. 4, 2021

(87) PCT Pub. No.: WO2020/066284
PCT Pub. Date: Apr. 2, 2020

(65) Prior Publication Data
US 2021/0323488 A1  Oct. 21, 2021

(30) Foreign Application Priority Data

Sep. 25, 2018 (JP) ................................. 2018-179309

(51) Int. Cl.
| | | |
|---|---|---|
| *B60R 13/08* | (2006.01) | |
| *E04B 1/86* | (2006.01) | |
| *G10K 11/162* | (2006.01) | |

(52) U.S. Cl.
CPC ............ *B60R 13/0823* (2013.01); *E04B 1/86* (2013.01); *G10K 11/162* (2013.01); *B60R 13/083* (2013.01)

(58) Field of Classification Search
CPC . B60R 13/08; B60R 13/0815; B60R 13/0823; B60R 13/083; B60R 13/0861;
(Continued)

(56) References Cited

U.S. PATENT DOCUMENTS

| | | | | | |
|---|---|---|---|---|---|
| 3,734,234 A | * | 5/1973 | Wirt | .................. | F02K 1/827 |
| | | | | | 428/116 |
| 4,184,905 A | * | 1/1980 | Ogata | .................. | E04C 2/32 |
| | | | | | 156/224 |

(Continued)

FOREIGN PATENT DOCUMENTS

| | | |
|---|---|---|
| CA | 2040076 C | 10/1991 |
| DE | 40 11 705 A1 | 10/1991 |

(Continued)

OTHER PUBLICATIONS

PCT Notification of Transmittal of Translation of the International Preliminary Report on Patentability (PCT/IB/338), dated Apr. 8, 2021 (1 page) (for PCT/JP2019/030125); Translation of PCT International Preliminary Report on Patentability (PCT/IPEA/409) (4 pages).

*Primary Examiner* — Gregory A Blankenship
(74) *Attorney, Agent, or Firm* — Christensen, Fonder, Dardi & Herbert PLLC

(57) ABSTRACT

A sound absorbing and insulating member alternately brought into contact with a first partition member and a second partition member. The sound absorbing and insulating member has a plurality of hollow protrusions protruding so as to traverse a gap between the partition members. There is a first and second space between the first and second partition member. The first space is formed in each protrusion and is closed by the first partition member. The second space is provided between adjacent protrusions and is closed by the second partition member. The first and second spaces communicate with each other through a communication part formed as a part of the protrusion. The communication part is configured to communicate an inside of the protrusion (Continued)

with an outside. An opening of the communication part opened to the second space is provided at a side wall of the protrusion.

7 Claims, 10 Drawing Sheets

(58) Field of Classification Search
CPC ..... E04B 2001/8414; E04B 2001/8419; E04B 2001/8428; E04B 2001/8433; E04B 2001/8471; E04B 2001/748; E04B 1/86; E04B 1/88; E04B 1/90
See application file for complete search history.

(56) References Cited

U.S. PATENT DOCUMENTS

| | | | | |
|---|---|---|---|---|
| 5,057,176 | A * | 10/1991 | Bainbridge | B60R 13/0225 428/184 |
| 2005/0263346 | A1 * | 12/2005 | Nishimura | G10K 11/16 181/290 |
| 2006/0289229 | A1 | 12/2006 | Yamaguchi | |
| 2008/0128201 | A1 * | 6/2008 | Yamaguchi | B32B 3/266 181/286 |
| 2010/0307867 | A1 * | 12/2010 | Ogawa | B32B 5/26 181/288 |
| 2011/0139542 | A1 * | 6/2011 | Borroni | B32B 7/022 181/290 |
| 2011/0250384 | A1 * | 10/2011 | Sumi | B32B 3/28 156/228 |
| 2013/0341889 | A1 * | 12/2013 | Neubauer | A63C 9/02 280/607 |
| 2015/0367958 | A1 * | 12/2015 | Lapstun | G01C 11/025 348/144 |
| 2016/0082901 | A1 * | 3/2016 | Bock | B60R 13/0212 296/187.05 |
| 2018/0345881 | A1 * | 12/2018 | Boyina | B21D 22/02 |
| 2018/0363558 | A1 * | 12/2018 | Weaver | G10K 11/172 |
| 2019/0001760 | A1 * | 1/2019 | Kouno | B60C 19/002 |
| 2019/0126984 | A1 * | 5/2019 | Yoshida | B32B 7/022 |
| 2020/0072101 | A1 * | 3/2020 | Ito | F02F 7/008 |
| 2021/0292975 | A1 * | 9/2021 | Segi | D21J 3/00 |
| 2021/0323488 | A1 * | 10/2021 | Segi | B32B 9/043 |
| 2023/0191886 | A1 * | 6/2023 | Nabuchi | B60R 13/0861 180/65.1 |

FOREIGN PATENT DOCUMENTS

| | | |
|---|---|---|
| JP | 10-326097 A | 12/1998 |
| JP | 2009-096342 A | 5/2009 |
| JP | 2015-108285 A | 6/2015 |
| JP | 2016-177117 A | 10/2016 |
| JP | 2017-031767 A | 2/2017 |
| JP | 2018-132676 A | 8/2018 |

* cited by examiner

SOUND ABSORBING AND INSULATING STRUCTURE

CROSS-REFERENCE TO RELATED APPLICATIONS

The present application is a U.S. National Phase entry of, and claims priority to, PCT Application No. PCT/JP2019/030125, filed Aug. 1, 2019, which claims priority to Japanese Patent Application No. 2018-179309, filed Sep. 25, 2018, all of which are incorporated herein by reference in their entireties for all purposes.

BACKGROUND

The present disclosure relates to a sound absorbing and insulating structure capable of absorbing and insulating sounds emitted from a plurality of sound sources. More specifically, the present disclosure relates to the sound absorbing and insulating structure where a sound absorbing and insulating member is arranged between a first partition member and a second partition member.

This type of sound absorbing and insulating member is used for various structures from the viewpoint of noise countermeasure. It is particularly suitably used as a structural member of a vehicle. For example, the vehicle interior article disclosed in Japanese Unexamined Patent Application Publication No. 2009-96342 is a plate-like resin member corresponding to the sound absorbing and insulating member of the present disclosure, and can be used as an interior material of a vehicle. The vehicle interior article has a surface side base material arranged on the vehicle interior side, and a back side base material arranged on the vehicle exterior side. A flat plate-like intermediate base material is interposed between the surface side base material and the back side base material. The surface side base material and the back side base material are provided with a plurality of cells forming a resonator structure, each cell having almost the same structure. For example, we will explain a resonator structure by exemplifying a surface side base material. An inside surface of the surface side base material, which faces the intermediate base material, has projected lattice-like ribs. The inside surface is partitioned into the plurality of cells by the ribs. A bottom side of each cavity is provided with an opening penetrating the surface side base material in the thickness direction. This opening allows for communication between an inside and an outside of the surface side base material. In Japanese Unexamined Patent Application Publication No. 2009-96342, a vehicle interior material is used as a deck board or a door trim of a vehicle. The vehicle interior material is configured to absorb sounds emitted from the inside and the outside of the vehicle interior by utilizing the Helmholtz Resonance Principle. That is, the sound in the vehicle interior is attenuated and absorbed in the cavity after entering the opening of the surface side base material. The sound outside the vehicle interior is attenuated and absorbed in the cavity after entering the opening of the back side base material.

The sound absorbing and insulating member may be used in combination with other interior materials, from the viewpoint of securing a vehicle interior space and/or improving design. However, the sound absorbing performance of the vehicle interior article disclosed in Japanese Unexamined Patent Application Publication No. 2009-96342 can be lowered when used together with another interior material. Thus, the configuration of the vehicle interior article was not so user-friendly. Specifically, when the opening, which plays an important role of a resonator structure, of the vehicle interior article is blocked by the other interior article, its sound absorbing performance can be remarkably reduced. Japanese Unexamined Patent Application Publication No. 2017-31767 discloses a metallic sound absorbing structural material disposed between a pair of wall materials. The sound absorbing structural material has a body member, which is a cubic hollow member, and a ventilation member, which communicates an inside of the body member and an outside of the body member. According to publication No. 2017-31767, when the body member is disposed between the pair of wall materials, side surfaces of the body member are arranged in a gap between the pair of wall materials. Therefore, by retrofitting the ventilation member to the side surface of the body member, even if the body member is arranged between the pair of wall materials, the ventilation member can be prevented from being blocked by each wall material.

According to publication No. 2017-31767, the body member and the ventilation member are separate. Thus, the sound absorbing structural material could not be easily adopted from the viewpoint of reducing the number of parts. Further, the sound absorbing structural material has only one body member for sound absorbing. Thus, the sound absorbing structural material is somewhat unsuitable for absorbing sound emitted from a plurality of sound sources. It is possible to arrange a plurality of sound absorbing structural materials between the wall materials. However, if this is done, the structure of a vehicle would be complicated. Therefore, an improved sound absorbing and insulating structure is required.

BRIEF SUMMARY

According to a first aspect of the present disclosure, a sound absorbing and insulating structure comprises a sound absorbing and insulating member, a first partition member provided between the sound absorbing and insulating member and a first sound source, and a second partition member provided between the sound absorbing and insulating member and a second sound source. This type of sound absorbing and insulating structure is desired to efficiently absorb and insulate sounds emitted from a plurality of sound sources utilizing a relatively simple configuration.

The sound absorbing and insulating member in the present aspect is a plate-like member formed in a bent shape so as to be alternately brought into contact with the first partition member and the second partition member. The sound absorbing and insulating member has a plurality of hollow protrusions protruding, so as to fill a gap between the first partition member and the second partition member. There is a first space and a second space between the first partition member and the second partition member. The first space is closed by the first partition member, so as to be formed in the protrusion. The second space is closed by the second partition member, so as to be formed between adjacent protrusions. In this aspect, the first space and the second space communicate with each other via a communication part formed as a part of the protrusion. The communication part is configured to communicate with an inside and an outside of the protrusion. An opening of the communication part opened to the second space is provided at a side wall of the protrusion. The side wall is arranged between the first partition member and the second partition member. In this aspect, the sound absorbing and insulating member is bent so as to form the plurality of protrusions. This allows for forming the first space and the second space by utilizing both partition members. This constitution is suitable for absorbing sounds emitted from the first sound source and the second sound source. The communication part is formed as a part of the protrusion. Thus, the structure of the sound absorbing and insulating member can be simplified, compared with a case where they separately formed. Further, the first space and the second space communicate with each other via the communication part formed in the side wall of the protrusion. Thus, the communication part can be prevented from being blocked by the partition members.

According to a second aspect of the present disclosure, further to the first aspect of the sound absorbing and insulating structure, the sound absorbing and insulating member is made of a material in which a plurality of cellulosic fibers are integrated in a laminated state. The sound absorbing and insulating member in the present aspect is composed of a laminated body made of the cellulosic fibers having an excellent sound absorbing and insulating performance. This structure also contributes to weight reduction, compared with a sound absorbing and insulating member made of resin and/or metal.

According to a third aspect of the present disclosure, further to the first or the second aspect of the sound absorbing and insulating structure, the protrusion is a cylindrical portion having a hat cross-sectional shape and has a pair of opposed side walls. One side wall of the pair of the side walls is provided with the opening of the communication part. This side wall is inclined so that it gradually separates from the other side wall in a direction from the second partition member to the first partition member. In this aspect, the protrusion has the hat cross-sectional shape, and at least one side wall of the pair of the side walls is inclined. In this way, the structural strength of the sound absorbing and insulating member can be improved. Further, the inclined side wall is provided with the opening of the communication part. Thus, the configuration of the communication part can be relatively freely changed.

According to a fourth aspect of the present disclosure, in the first or second aspect of the sound absorbing and insulating structure, the protrusion has a ceiling wall in contact with the second partition member, in a state of being applied thereto. The communication part is provided in the ceiling wall. The communication part serially has a first passage and a second passage. The first passage extends in a thickness direction of the ceiling wall, so as to communicate with the first space. The second passage is formed in a groove-like shape on the ceiling wall and is opened to the side wall. In this aspect, the configuration of the communication part can be relatively freely changed by adjusting the position and/or the length of each passage in the ceiling wall.

According to a fifth aspect of the present disclosure, further to any one of the first to fourth aspects of the sound absorbing and insulating structure, the first partition member, the second partition member, and the sound absorbing and insulating member form a part of a vehicle. The sound absorbing and insulating member is made of a material in which cellulosic fibers are integrated in a laminated state. An outer surface of the sound absorbing and insulating member is located on a vehicle interior side of the vehicle and has a larger uneven shape, compared to an inner surface opposite to the outer surface. In this aspect, the outer surface has a relatively larger uneven shape and is located at the vehicle interior side. Thus, the sound absorbing and insulating structure is configured to efficiently absorb and insulate sound emitted from the vehicle interior.

DETAILED DESCRIPTION

Figure 2:
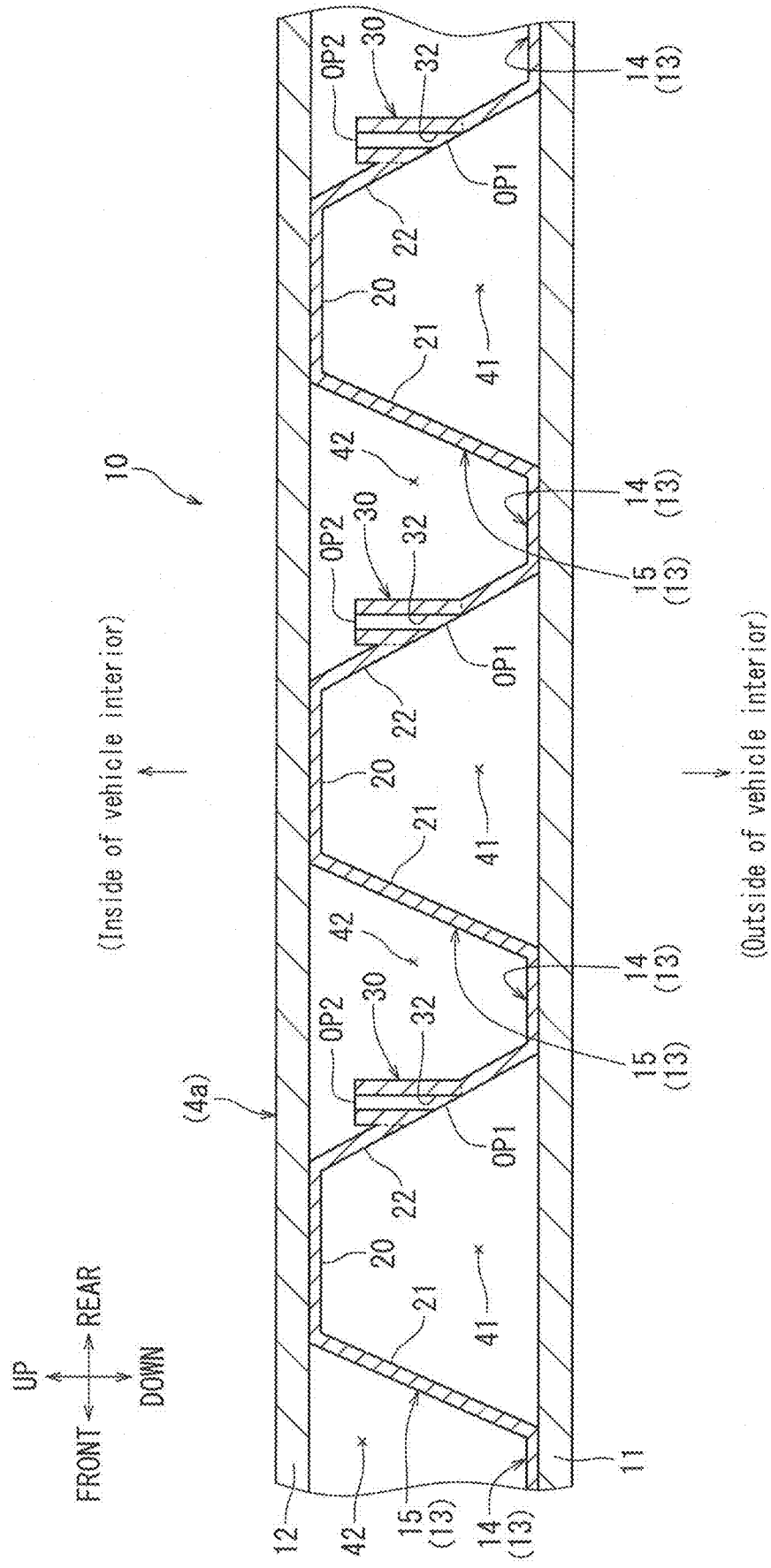
FIG. 2 is an enlarged schematic perspective side view showing a part of a vehicle.
Figure 3:
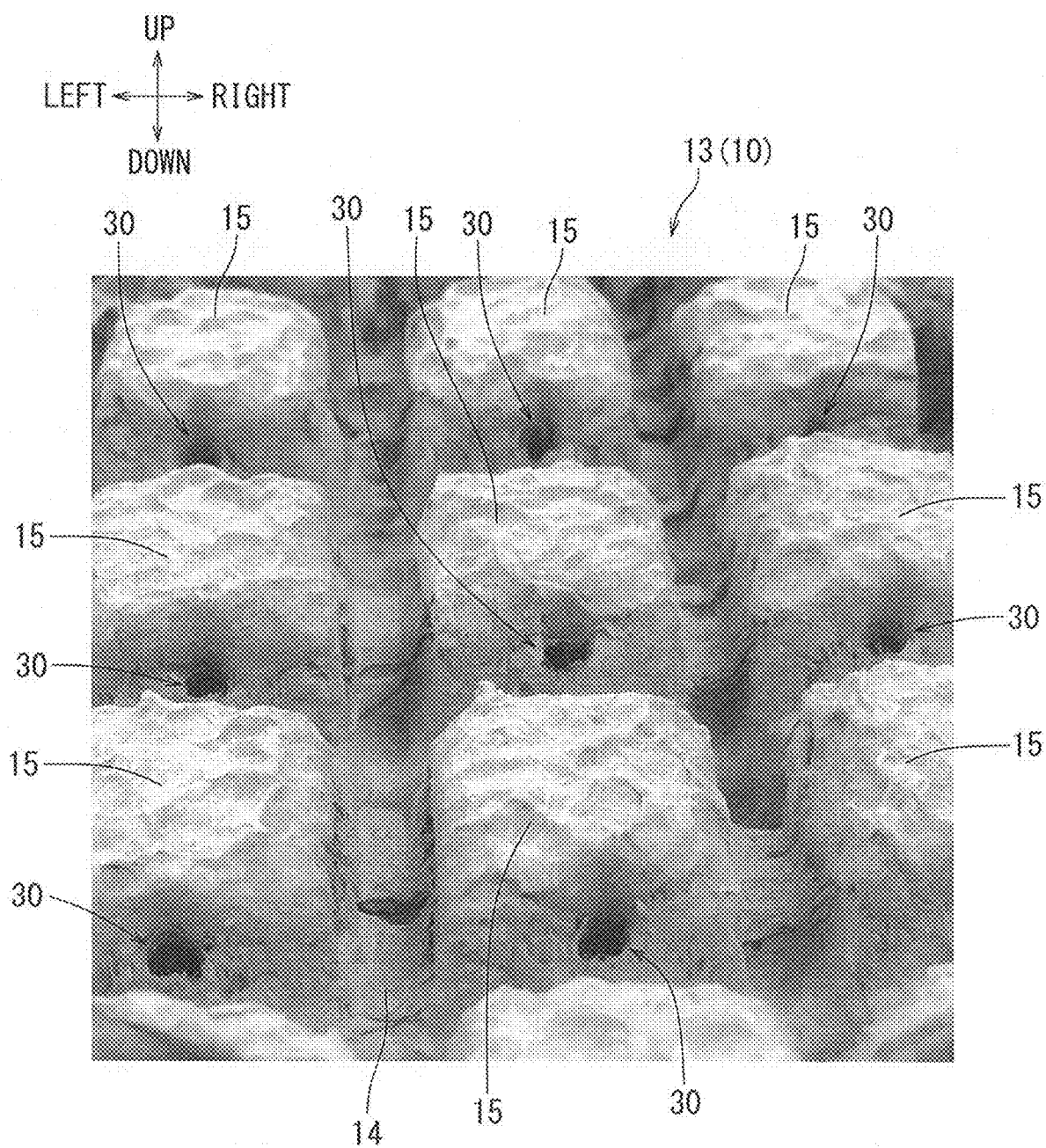
FIG. 3 is a perspective view of a sound absorbing and insulating member.
Figure 4:
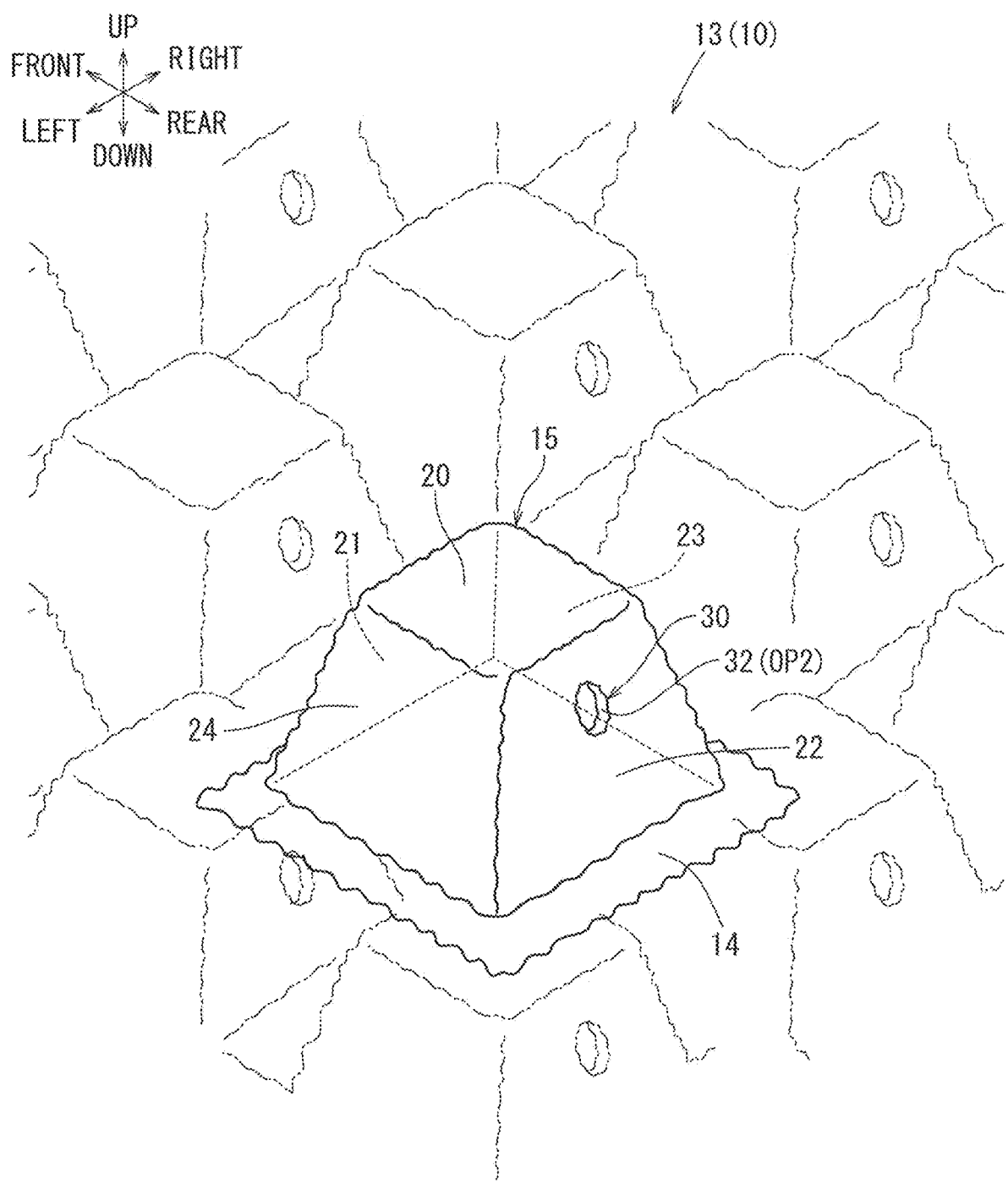
FIG. 4 is an enlarged perspective view of the sound absorbing and insulating member.

An embodiment for carrying out the present disclosure will be described below with reference to FIGS. 1 to 14. In each Figure, arrows showing a longitudinal direction and a vertical direction of a vehicle are appropriately shown for convenience. In FIGS. 3, 4, and 9, arrows indicating a longitudinal direction, a lateral direction, and a vertical direction of a sound absorbing and insulating member are shown with reference to a state where the sound absorbing and insulating member is attached to the vehicle.

First Embodiment

Figure 1:
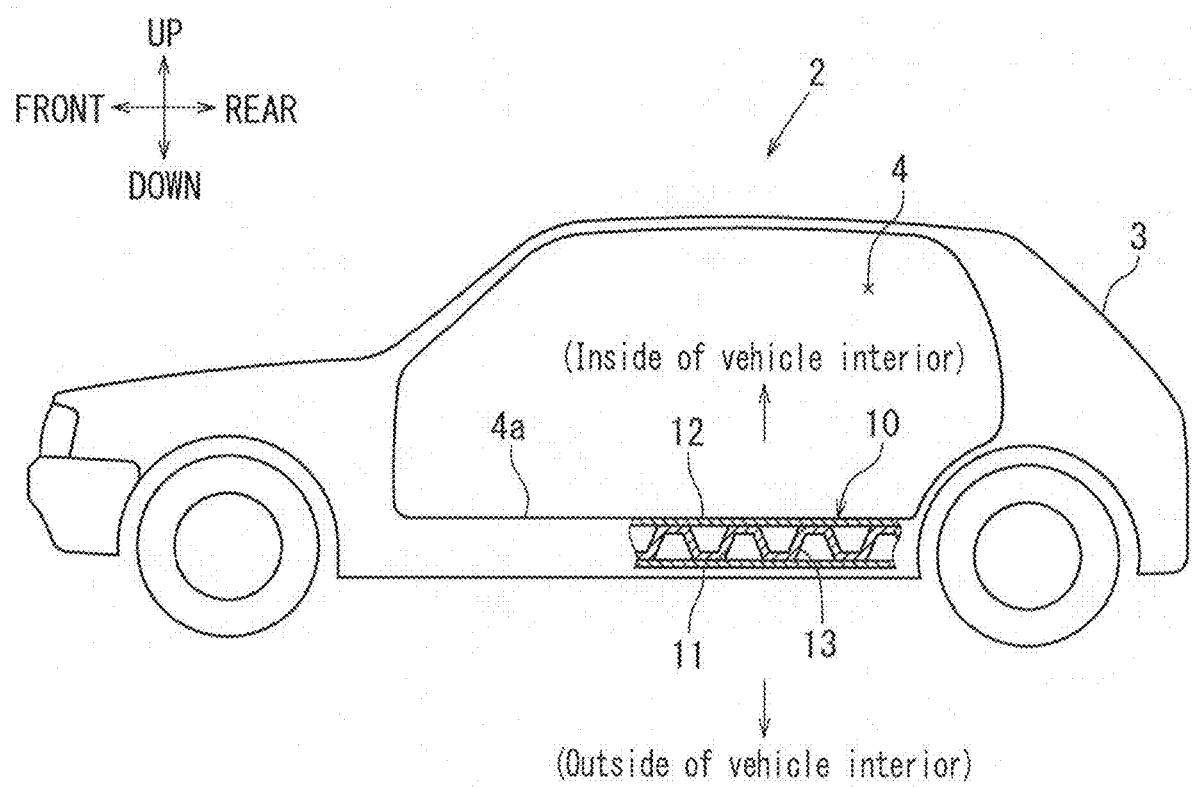
FIG. 1 is a schematic perspective side view of a vehicle.

A vehicle 2 shown in FIG. 1 has a vehicle body 3 forming an outer shape, a vehicle interior 4 surrounded by the vehicle body 3, and a sound absorbing and insulating structure 10 configured to absorb and insulate sounds emitted from an inside and an outside of the vehicle interior. The sound absorbing and insulating structure 10 is arranged on a floor 4a side of the vehicle interior 4. The sound absorbing and insulating structure 10 has a first partition member 11 located outside of the vehicle interior, a second partition member 12 located inside of the vehicle interior, and a sound absorbing and insulating member 13. The sound absorbing and insulating member 13 is arranged between the first partition member 11 and the second partition member 12. In the present embodiment, the sound absorbing and insulating structure 10 is configured to absorb sounds emitted from the inside and the outside of the vehicle (from different sound sources) by using the Helmholtz Resonance Principle. With reference to FIG. 2, the sound absorbing and insulating structure 10 has a first space 41 and a second space 42, described later. The first and second spaces 41, 42 are connected via a communication part 30 of the sound absorbing and insulating member 13. That is, the communication part 30 is shared by the first and second spaces 41, 42. It is desired that this type of sound absorbing and insulating structure 10 is relatively simple. In the present embodiment, a sound absorbing and insulating structure 10 having a simple constitution is used to efficiently absorb sounds emitted from a plurality of sound sources. The details are described below.

[First Partition Member and Second Partition Member]

The first partition member 11 shown in FIG. 2 is a plate-like or planar member disposed outside the vehicle interior. The second partition member 12 is a plate-like or planar member disposed inside the vehicle interior. Various materials allowing for passage of sound can be used as a material of each the partition member 11, 12. These kinds of materials may include surface materials such as cloth, leather, and felt, various kinds of a resin and rubber plate materials, metal plate materials made of the same or different kinds as that of the vehicle body, and the same kind of material as the sound absorbing and insulating member 13, described later. It is desirable to use a relatively flexible material to form the second partition member 12. For example, a surface material or a resin plate material which can be used as a carpet can be adopted as the flexible material. A gap where the sound absorbing and insulating member 13 can be disposed is formed between the first partition member 11 and the second partition member 12. Both of the partition members 11, 12 are arranged substantially parallel to each other in the longitudinal direction at an arrangement place of the sound absorbing and insulating member 13.

[Sound Absorbing and Insulating Member]

The sound absorbing and insulating member 13 shown in FIGS. 2 to 4 is a plate-like member having a predetermined area. The sound absorbing and insulating member 13 is arranged in a state of being sandwiched between the first partition member 11 and the second partition member 12. The sound absorbing and insulating member 13 is bent so as to be alternately brought into contact with the first partition member 11 and the second partition member 12. The sound absorbing and insulating member 13 has a bottom wall 14, a plurality of protrusions 15, and a plurality of communication parts 30 (described later). The bottom wall 14 is a plate-like member forming a lower surface of the sound absorbing and insulating member 13. The bottom wall 14 is brought into surface contact with an upper surface of the first partition member 11. As shown in FIG. 3, when the sound absorbing and insulating member 13 is viewed from above, the sound absorbing and insulating member 13 is provided with the plurality of protrusions 15 in longitudinal and lateral rows. The bottom walls 14 are provided so as to fill the gap between the protrusions 15.

[Protrusion]

The plurality of the protrusions 15 project upward from the bottom wall 14 so as to fill the gap between the first partition member 11 and the second partition member 12. The protrusions 15 may have substantially the same basic configuration. Thus, the details of one protrusion is described below as an example. The protrusion 15 shown in FIGS. 4 and 5 may be a hollow cylindrical part forming a truncated square pyramid shape. The protrusion 15 may have a ceiling wall 20 forming an upper surface, four side walls 21 to 24 forming peripheral surfaces, and a communication part 30. The ceiling wall 20 is a rectangular plate-like member as seen from above. The ceiling wall 20 is in surface contact with the lower surface of the second partition member 12 in a state of being applied thereto. In the protrusion 15, the bottom wall 14 is not arranged below the ceiling wall 20. Thus, the protrusion 15 may have an open part. The protrusion 15 is closed by the first partition member 11.

[Side Walls]

Figure 5:
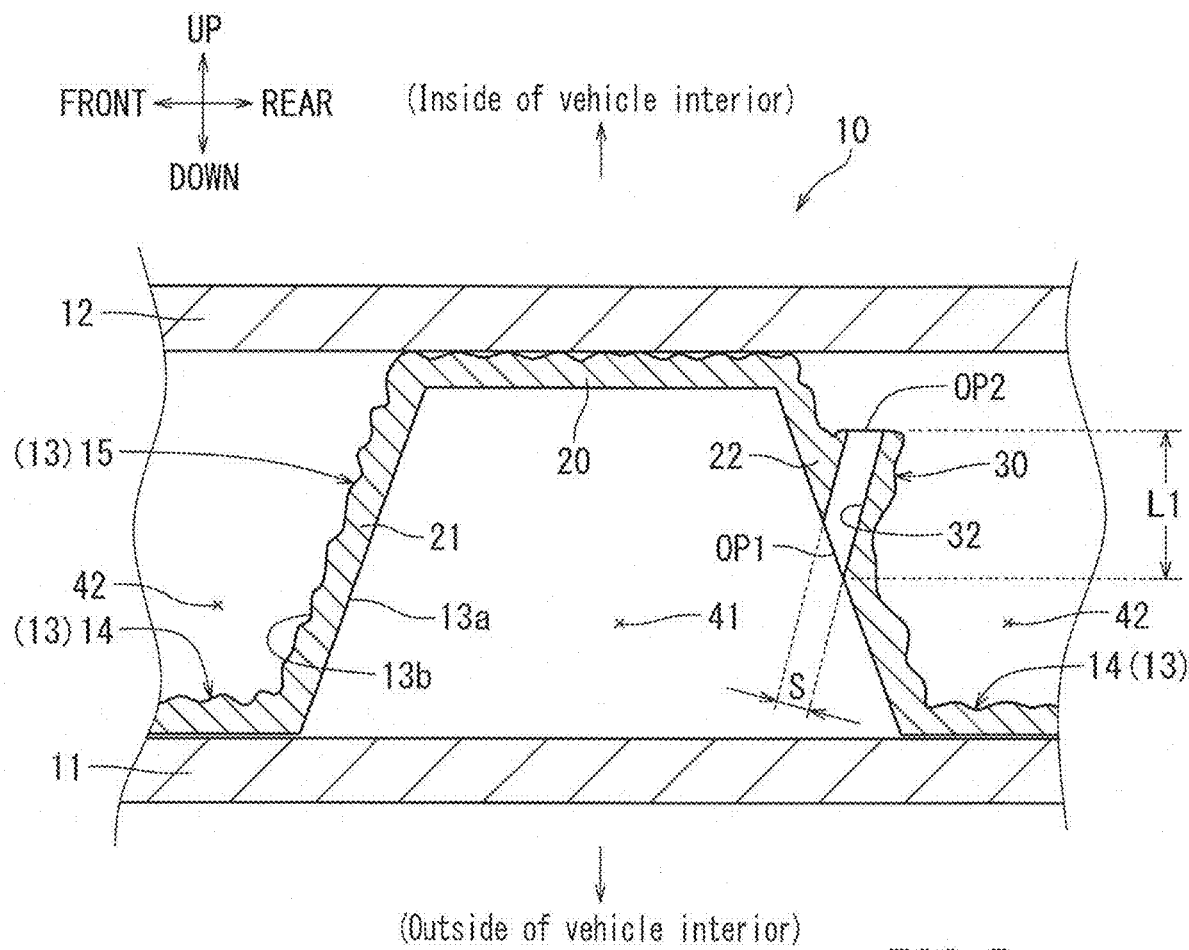
FIG. 5 is a schematic sectional view of a sound absorbing and insulating structure.

The four side walls (a front side wall 21, a rear side wall 22, a right side wall 23, a left side wall 24) shown in FIG. 4 connect the corresponding sides of the ceiling wall 20 to the bottom wall 14. The four side walls 21 to 24 are arranged between the first partition member 11 and the second partition member 12. In the protrusion 15, opposing side walls are arranged so as to form a hat cross-sectional shape. In this way, the structural strength of the protrusion 15 can be enhanced. In other words, the front side wall 21 forming a front face of the protrusion 15 and the rear side wall 22 forming a rear face of the protrusion 15 may be inclined so as to gradually separate from each other in a direction from the ceiling wall 20 to the bottom wall 14, as shown in FIG. 5. In the present embodiment, the front side wall 21 and the rear side wall 22 correspond to a pair of side walls. The rear side wall 22 corresponds to one side wall, and the front side wall 21 corresponds to the other side wall. The right side wall 23 forming a right face and the left side wall 24 forming a left face of the protrusion 15 may also be inclined so as to gradually separate from each other in the direction from the ceiling wall 20 to the bottom wall 14, as shown in FIG. 4. In this way, the protrusion 15 may be formed to have a hat cross-sectional shape so as to have enhanced strength. Thus, even when a load is applied in the direction vertical to the protrusion 15 through the second partition member 12 shown in FIG. 2, the appropriate shape of the protrusion 15 can be maintained. Therefore, the sound absorbing and insulating member 13 can be used as a reinforcing member and/or a raising member, etc. for a vehicle and has a good usability.

[Communication Part]

The communication part 30 shown in FIGS. 2-5 is configured to communicate the inside with the outside of the protrusion 15, and is also configured to connect the first space 41 and the second space 42. Since each protrusions 15 is provided with a communication part 30 having almost the same constitution, one protrusion 15 is used to describe the details of the communication part 30 as an example. The communication part 30 of the protrusion 15 shown in FIGS. 4 and 5 may be formed utilizing a part of the rear side wall 22. The communication part 30 of the protrusion 15 may have a passage part 32 communicating the inside with the outside of the protrusion 15. The communication part 30 can be considered as a cylindrical portion vertically projecting relative to the inclined rear side wall 22. The communication part 30 has a predetermined length dimension L1 in the vertical direction.

[Passage Part]

The passage part 32 shown in FIG. 5 may have an opening area S allowing for passage of gas. The passage part 32 may penetrate the rear side wall 22 along an axial direction of the communication part 30 and may penetrate in a thickness direction (vertical direction in FIG. 5). The passage part 32 may have a first opening OP1 and a second opening OP2. A first opening OP1 may open in the protrusion 15 at a lower end of the communication part 30. A second opening OP2 may open at an upper end of the communication part 30. The second opening OP2 corresponds to an opening located at the second space side of the communication part in the present disclosure. The second opening OP2 is provided in the rear side wall 22 of the protrusion 15 and is arranged to face the second space 42. In the communication part 30, according to the Helmholtz Resonance Principle, a frequency of sound to be absorbed can be set by adjusting an opening ratio of the passage part 32. The rear side wall 22 may be provided with a single or a plurality of the communication part(s) 30 (passage part(s) 32). When a single communication part 30 is formed, the opening ratio can be defined by a ratio between the opening area S of the passage part 32 and an area of the rear side wall 22. When the plurality of communication parts 30 are provided, the opening ratio can be defined by a ratio between the total opening area of all passage parts 32 and the area of the rear side wall 22.

[Material of the Sound Absorbing Member]

The sound absorbing and insulating member 13 shown in FIGS. 2-5 may be formed from a material suitable for absorbing and/or insulating sound. It is preferably formed of a material having a rigidity capable of maintaining an outer shape of the protrusion 15. This kind of materials may include a fiber laminated body formed of fibers, such as cellulosic fibers, animal fibers, mineral fibers, or inorganic fibers. Additionally, this kind of material may include various resin (including elastomer) plate materials, rubber plate materials, and metal plate materials made of the same or different kinds of materials as a material of the vehicle body 3. Particularly, the fiber laminated body may be used as it is light in weight, compared with a metal or a resin, and has excellent sound absorbing and/or sound insulating performance. Thus, the fiber laminated body can be suitably used as a material of the sound absorbing and insulating member 13. In this embodiment, the sound absorbing and insulating member 13 may be formed of a material where a plurality of cellulosic fibers are integrated in a laminated state. Plant fibers (natural fibers), regenerated fibers, refined fibers, and/or semi-synthetic fibers can be used as the cellulosic fibers. Considering convenience of raw material procurement and recyclability, cellulosic fibers obtained from pulp (described later) can be suitably used. The surface of the sound absorbing and insulating member 13 may have a moderate hardness since the cellulosic fibers are densely interlaced and integrated. Thus, the surface of the sound absorbing and insulating member 13 allows for moderately insulating the sound of the inside and the outside of the vehicle interior.

[Method for Forming the Sound Absorbing and Insulating Member]

A method for forming the sound absorbing and insulating member 13 shown in FIGS. 3-5 may be suitably set depending on a material to be used. For example, the sound absorbing and insulating member 13 in this embodiment can be formed by pulp molding using a molding die (not shown). The molding die 60 may have a molding surface forming its outer surface, a net material arranged along the molding surface, and a liquid suction part opened in the molding surface. The molding surface is provided with a plurality of convex portions arranged at an appropriate interval for forming the protrusion 15. A flat part for forming the bottom wall is provided between adjacent convex portions. The net material is a net-like member allowing passage of the liquid, but not substantially allowing passage of the cellulosic fibers. The net material is disposed so as to cover almost the whole surface of the molding surface. The liquid suction part is configured to suck liquid into the molding die, as described later. The liquid suction part may have a plurality of openings provided at proper positions of the molding surface. The liquid suction part may have a pump (not shown) and a flow passage (not shown) in the molding die for transferring the sucked liquid to a predetermined place.

The molding die is immersed in a raw liquid (described later) containing cellulosic fibers. Then, liquid in the raw liquid is sucked through the net material from the liquid suction part, so as to laminate the cellulosic fibers on the net material. For example, after the molding surface is immersed in the raw liquid in a state where the molding die is set upside down, the liquid in the raw liquid is sucked through the liquid suction part opened to the molding surface. Since the cellulosic fibers contained in the raw liquid cannot pass through the net material, the cellulosic fibers are gradually laminated on the net material. After a desired amount of the cellulosic fibers is laminated on the net material, the molding die is raised from the raw liquid. Then, the laminated cellulosic fibers are dried, so as to be integrated. In this way, the sound absorbing and insulating member 13 shown in FIG. 5 can be formed of a material in which the cellulosic fibers are integrated in a laminated state. Additionally, the protrusion 15 is provided with the communication part 30 (outer shape), which is in the integrated state. Next, the dried sound absorbing and insulating member 13 is removed from the molding die. The communication part 30 is provided with the passage part 32, so that the inside and the outside of the protrusion 15 can communicate with each other via the passage part 32. The passage part 32 may be simultaneously formed with the communication part 30. In this case, a rod-like or plate-like projection portion for forming the passage part may project preferably from the molding surface.

The average thickness dimension (an average laminated amount of the cellulosic fibers after drying) of the sound absorbing and insulating member 13 shown in FIG. 5 is not particularly limited, as long as the proper rigidity of the sound absorbing and insulating member 13 can be secured. For example, when the sound absorbing and insulating member 13 is used as an interior material of a vehicle, the average thickness dimension of the sound absorbing and insulating member 13 can generally be set in a range of 1.5 mm to 15 mm. It is desirable to set the average thickness dimension in a range of 2.0 mm to 8.0 mm in light of securing light weight. If a length dimension L1 of the communication part 30 is ensured by the thickness dimension of the rear side wall 22, the thickness dimension of the rear side wall 22 where the communication part is formed can be set independent of the other side walls. Thus, the thickness dimension of the rear side wall 22 may be appropriately set depending on the performance of the communication part 30 and may depart from the above-mentioned range of the thickness dimension.

[Raw Liquid]

The method for preparing the raw liquid is not particularly limited. However, as a general preparation method, after a predetermined amount (for example, an amount including a solid content of 0.5 wt. % or more) of pulp is put into water, the mixture may be stirred until it enters a slurry state. The pulp may include one or more kind of chemical pulp, mechanical pulp, waste paper pulp, or non-wood pulp, which may be used alone or in combination. It is desirable to use waste paper pulp from a viewpoint of recycling or the like. For example, the waste paper pulp may include a defibrated waste paper pulp, a defibrated and deinked waste paper pulp, or defibrated, deinked, and bleached waste paper pulp. Raw materials of the waste paper pulp may be obtained from selected waste papers or a non-sorted waste papers, such as high-quality papers, medium quality papers, lower quality papers, newspapers, leaflets, and/or magazines. For example, the chemical pulp may include a softwood unbleached kraft pulp (NUKP), hardwood unbleached kraft pulp (LUKP), softwood bleached kraft pulp (NBKP), hardwood bleached kraft pulp (LBKP), softwood semi-bleached kraft pulp (NSBKP), hardwood semi-bleached kraft pulp (LSBKP), softwood sulfite pulp, or hardwood sulfite pulp. For example, the mechanical pulp may include a stone ground pulp (SGP), pressurized stone ground pulp (PGW), refiner ground pulp (RGP), thermo-ground pulp (TGP), chemical ground pulp (CGP), or thermo-mechanical pulp (TMP). For example, the non-wood pulp may include a pulp made from non-woody fibers, such as kenaf, hemp, or reed.

The raw liquid may contain an additive which contributes to the improvement of the performance of the sound absorbing and insulating member 13 shown in FIG. 5. For example, the additive may include a sizing agent, a paper strengthening agent such as a dry paper strengthening agent and a wet paper strengthening agent, a pH adjuster, a freeness improver, a defoaming agent, a bulking agent, a retention aid, an antibacterial agent, an antifungal agent, a filler, and/or a dye. In particular, the raw liquid may preferably include at least one of a sizing agent contributing to improvement of water resistance by preventing infiltration of water, a dry paper strengthening agent contributing to improvement of breaking strength in a dry state, and a wet paper strengthening agent contributing to improvement of strength in a wet condition. Examples of the sizing agent may include a rosin-based sizing agent, an AKD-based sizing agent, an alkenyl succinic anhydride (ASA)-based sizing agent, a petroleum-based sizing agent, and a neutral rosin sizing agent. Examples of the dry paper strengthening agent may include a polyacrylamide-based polymer such as an anionic polyacrylamide resin, a polyvinyl alcohol polymer, a cationic starch, modified starches, urea-formalin resin and melamine-formalin resin. Examples of the wet paper strengthening agent may include a polyamide polyamine epichlorohydrin resin (or a modified product thereof). The addition amount of each additive relative to the raw liquid is not particularly limited, as long as the desired performance can be imparted to the sound absorbing and insulating member 13. For example, the sizing agent may be added in a range of 0.5-5 wt. %, preferably 1.0 wt. % or more. The dry paper strengthening agent may be added in a range of 0.5-5 wt. %, preferably 3.0 wt. % or more. The wet paper strengthening agent may be added in a range of 2-15 wt. %, preferably 4.0 wt. % or more.

[Inner Surface and Outer Surface of the Sound Absorbing and Insulating Member]

The sound absorbing and insulating member 13 of FIGS. 3-5 manufactured in this way has the proper strength and is relatively lightweight, since it is formed of the plurality of cellulosic fibers laminated and integrated. With reference to FIG. 5, due to the pulp molding process, the inner surface 13a of the sound absorbing and insulating member 13 arranged on the net material side is formed in a relatively smooth state. This is because the inner surface 13a is formed in contact with the net material. Unlike this, the outer surface 13b of the sound absorbing and insulating member 13 has a larger surface roughness, compared to the inner surface 13a, because the cellulosic fibers can be unevenly laminated. Thus, the outer surface 13b is excellent in a diffusion performance of reflected sound, compared with the inner surface 13a formed on the opposite side. Because of this structure, it is possible to avoid as much as possible a situation in which reverberation of a sound is repeated in a specific direction and in which the sound is amplified. When the sound absorbing and insulating member 13 is installed, it is desirable that the outer surface 13b is directed to the second partition member 12 (vehicle interior side) and that the inner surface 13a is directed to the first partition member 11. This improves the quietness in the vehicle interior.

[Constitution of the Sound Absorbing and Insulating Member]

In the vehicle 2 shown in FIG. 1, the sound absorbing and insulating structure 10 is provided in a floor 4a of the vehicle interior 4 for the purpose of absorption and insulation of sounds emitted from the inside and the outside of the vehicle interior, which are different sound sources. The sound absorbing and insulating structure 10 shown in FIG. 2 may absorb the sounds utilizing the Helmholtz Resonance Principle, utilizing the first space 41, the second space 42, and the communication part 30, as will be described later. It is desired that such sound absorbing and insulating structure 10 can more efficiently absorb and insulate sounds emitted from different sound sources using a relatively simple constitution.

[First Space, Second Space]

In the sound absorbing and insulating structure 10 shown in FIG. 2, the sound absorbing and insulating member 13 has a plurality of hollow protrusions 15 which are bent so as to be alternately brought into contact with the first partition member 11 and the second partition member 12. The plurality of protrusions 15 protrude so as to fill the gap between the first partition member 11 and the second partition member 12. The first space 41 and the second space 42 are formed between the first partition member 11 and the second partition member 12. The first space 41 in the protrusion 15 is closed by the first partition member 11. The second space 42 is provided between adjacent protrusions 15 and is closed by the second partition member 12. The first space 41 and the second space 42 are configured to attenuate and absorb sound incident on the communication part 30 by utilizing the Helmholtz Resonance Principle. In the sound absorbing and insulating structure 10, the sound absorbing and insulating member 13 is bent so as to form the plurality of protrusions 15 so that the spaces 41, 42 can be provided by utilizing the partition members 11, 12.

The first space 41 and the second space 42 shown in FIG. 2 are connected to each other via the communication part 30, which is formed of a part of the protrusion 15. The communication part 30 communicates the inside of the protrusion 15 with the outside of the protrusion 15. The second opening OP2 of the communication part 30 is provided on the rear side wall 22 of the protrusion 15, which is arranged between the first partition member 11 and the second partition member 12. In this way, the structure of the sound absorbing and insulating member 13 can be simplified by forming the communicating part 30 utilizing a part of the protrusion 15, compared with a sound absorbing and insulating member where the communicating part 30 and the protrusion 15 are separated. The second opening OP2 of the communication part 30 is provided at the rear side wall part 22, and is disposed above the first partition member 11 and below the second partition member 12. Thus, the communication part 30 can be prevented from being blocked by the partition members 11, 12. In this way, the sound absorbing and insulating structure 10 of this embodiment may have a relatively simple constitution, allowing for efficient absorption and insulation of the sounds emitted from the inside and the outside of the vehicle interior, which are different sound sources.

[Helmholtz Resonance Principle]

Figure 6:
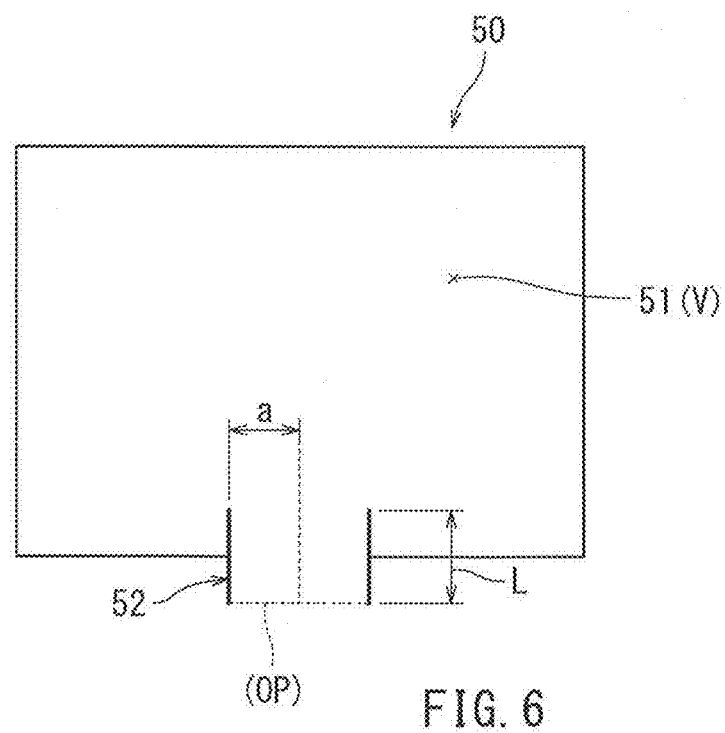
FIG. 6 is a schematic view of a Helmholtz resonator.

We describe the Helmholtz Resonance Principle on the basis of the Helmholtz resonator 50 shown in FIG. 6. The Helmholtz resonator 50 can define a frequency of sound to be absorbed by the configuration of an internal space 51 and a communication part 52 of the resonator. In this Helmholtz resonator 50, V (cm³) is defined as an internal volume of the internal space 51, L (cm) is defined as a length of the communication part 52, a (cm²) is defined as a radius of the opening OP of the communication part 52, and c (cm/s) is defined as the speed of sound. The frequency f (Hz) of the sound incident on the communication part 52 can be obtained according to the following Formula (1). The Helmholtz resonator 50 can absorb sound having this frequency f. The frequency f is inversely proportional to the square root of the volume V of the internal space 51 and the length L of the communication part 52. The frequency f is directly proportional to the square root of the opening area πa² (opening ratio) of the communication part 52.

$$f = (c/2\pi) \times \sqrt{(\pi a^2/(V(L \times 0.6a)))} \quad \text{Formula 1:}$$

Figure 11:
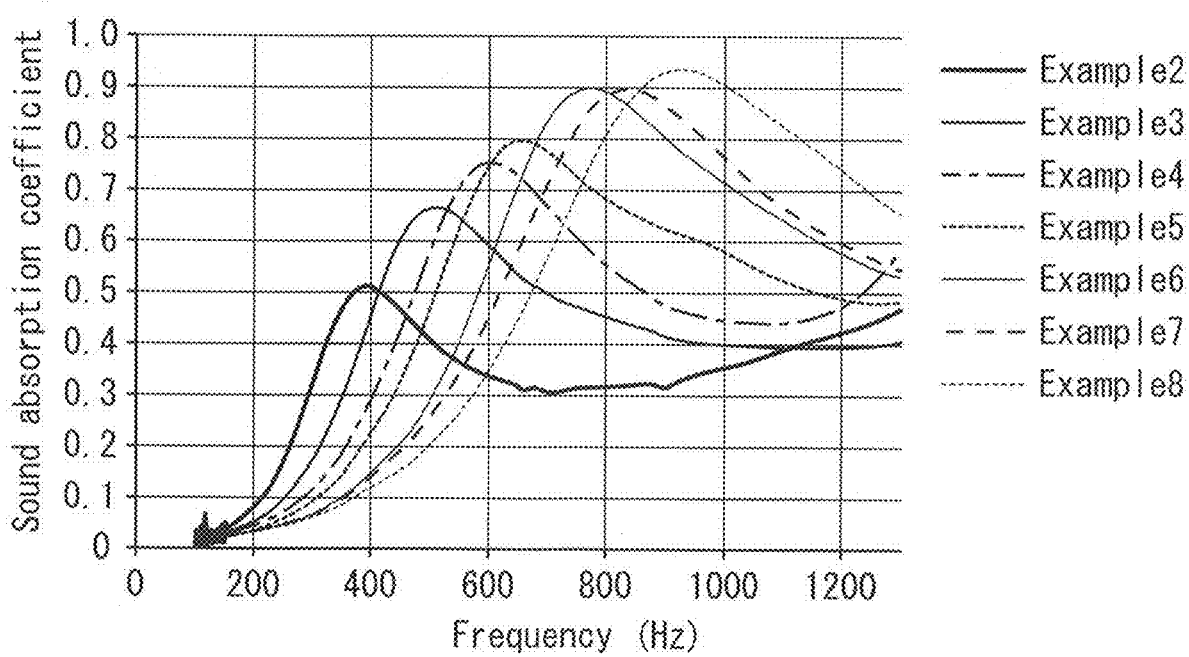
FIG. 11 is a graph showing a relationship between an opening ratio, the sound absorbing coefficient, and the frequency.

The volumes of the first space 41 and the second space 42 shown in FIG. 11 can be appropriately set according to a frequency of the sound to be muffled. For example, in this embodiment, the longitudinal interval dimension (longitudinal length of the bottom wall 14) between the protrusions 15 may be set to be smaller than the longitudinal dimension of each protrusion 15. This allows the volume of the first space 41 to be larger than that of the second space 42. According to the Helmholtz Resonance Principle, when the communication part 30 is shared, a relatively low frequency sound can be attenuated in the first space 41 having a larger volume, and a relatively high frequency sound can be attenuated in the second space 42 having a smaller volume.

According to the Helmholtz Resonance Principle described above, the frequency f (Hz) of the incident sound gradually decreases as the communication part 52 of the resonator is lengthened. In this embodiment, the communication part 30 is provided at the inclined rear side wall 22, as shown in FIGS. 2 and 5. Thus, the configuration (length, orientation, etc.) of the communication part 30 can be relatively freely changed according to the sound to be absorbed. For example, the length dimension L1 of the communication part 30 may be increased and may project from the rear side wall 22 in order to efficiently absorb a low frequency sound. When the communication part 30 is extended in the vertical direction, the communication part 30 may extend upward in a natural manner from the inclined rear side wall 22. Further, adjacent protrusions 15 gradually separate from each in a direction going upward, as shown in FIG. 2. Thus, when the communication part 30 extends backward from the rear side wall 22, the communication part 30 can be prevented from interfering with the front side wall 21 of the protrusion 15 positioned behind it. Therefore, in this embodiment, the length dimension L1 of the communication part 30 can be changed relatively freely depending on the sound to be absorbed. This configuration may be preferred, especially to absorb low frequency sounds.

[Insulation and Absorption of Sound Emitted from the Outside of the Vehicle Interior (Vehicle Outside Sound)]

The sound absorbing and insulating structure 10 shown in FIG. 2 is provided with the above-described constitution, so that sound emitted from different sound sources can be efficiently absorbed and insulated. For example, with reference to FIG. 7, a vehicle outside sound SD1 emitted from a sound source located outside of the vehicle interior (first sound source) can be absorbed and insulated by the sound absorbing and insulating structure 10. The vehicle outside sound SD1 is insulated by the first partition member 11 and the protrusion 15 (each wall), when moving toward the vehicle interior (upper side in the figure). Then, the vehicle outside sound SD1 incident on the communication part 30 is absorbed in the second space 42. At this time, the vehicle outside sound SD1 is incident on the passage part 32 from the first opening OP1 in the first space 41. The vehicle outside sound SD1 then enters into the second space 42 via the second opening OP2. In this embodiment, the second opening OP2 is not closed by either of the partition members 11, 12. Thus, the vehicle outside sound SD1 can be efficiently absorbed by the second space 42. The second space 42 has smaller volume. Thus, the second space 42 can efficiently absorb a relatively high frequency sound, such as a road noise having a high sound frequency region to an intermediate sound frequency region.

[Insulation and Absorption of Sound Emitted from the Vehicle Interior (Vehicle Interior Sound)]

Figure 7:
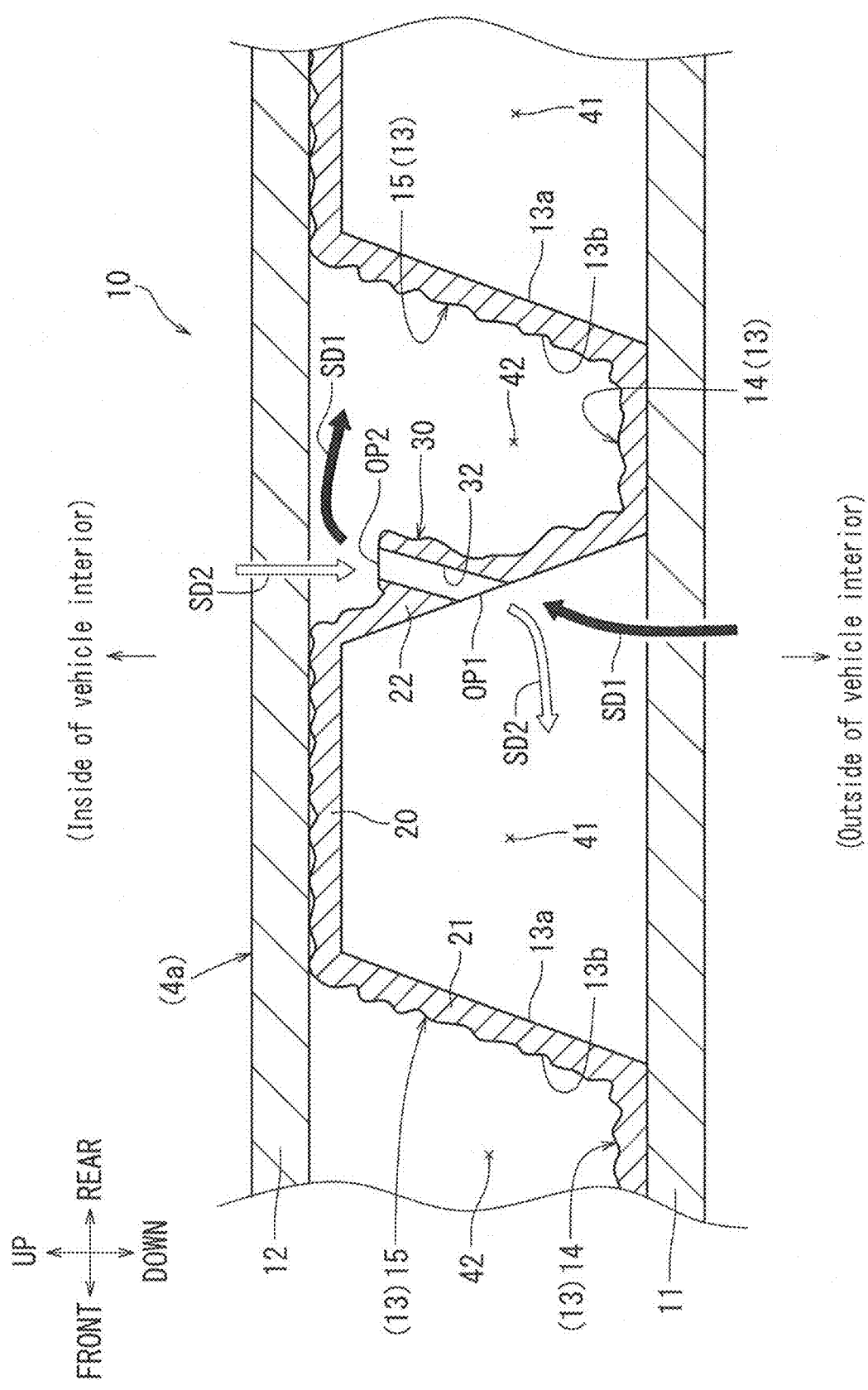
FIG. 7 is a schematic perspective side view of a vehicle showing a moving passage of sound.

Referring to FIG. 7, the sound absorbing and insulating structure 10 can absorb and insulate vehicle interior sound SD2 emitted from a sound source located at the inside of the vehicle interior (second sound source). The vehicle interior sound SD2 is insulated by the second partition member 12 and the protrusion 15 (each wall) when moving toward the outside of the vehicle interior (lower side in FIG. 7). Further, the vehicle interior sound SD2 is incident on the communication part 30 and is absorbed in the first space 41. At this time, the vehicle interior sound SD2 is incident on the passage part 32 from the second opening OP2. The vehicle interior sound SD2 then enters into the first space 41 via the first opening OP1. Also in this case, the second opening OP2 is not closed by either of the partition members 11, 12. Thus, the vehicle interior sound SD2 can be efficiently absorbed by the first space 41. The first space 41 has a larger volume. Thus, the first space 41 can efficiently absorb sound having relatively low frequency. In the vehicle interior 4, a reflection sound of the vehicle outside sound SD1 is included in addition to the vehicle interior sound SD2. Therefore, the sound absorbing and insulating member 13 of the present embodiment is arranged in a state where the outer surface 13b, which has an uneven shape, is directed to the inside of the vehicle interior of the vehicle 2. The outer surface 13b has a largely uneven shape and is excellent in sound diffusion performance. The sound absorbing and insulating structure 10 may be used to insulate the vehicle interior sound SD2 and the reflection sound, while avoiding as much as possible the amplification of the reverberation sound or the like. In this way, the sound absorbing and insulating structure 10 may be used to improve the quietness within the vehicle interior 4.

As described above, the sound absorbing and insulating member 13 may be bent so as to form the plurality of protrusions 15. The first space 41 and the second space 42 can be formed by utilizing partition members 11, 12. This configuration is suitable to absorb sounds emitted from the first sound source and the second sound source. Since the communicating part 30 is formed by a part of the protrusion 15, the structure of the sound absorbing and insulating member 13 can be simplified, compared with a sound absorbing and insulating member where they are separate. Further, the first space 41 and the second space 42 communicate with each other via the communication part 30 opened in the side wall (22) of the protrusion 15. Thus, the communication part 30 can be prevented from being blocked by either of the partition members 11, 12. The sound absorbing and insulating member 13 of this embodiment is composed of a laminated body made of cellulosic fibers having an excellent sound absorbing and insulating performance. This contributes to weight reduction, compared with the sound absorbing and insulating member 13 which is made of resin and/or metal. In the present embodiment, the protrusion 15 has a hat cross-sectional shape, and at least one of the pair of side walls (e.g., 21, 22) is inclined. In this way, the strength of the sound absorbing and insulating member 13 can be structurally improved. The second opening OP2 of the communication part 30 is provided at the inclined side wall (e.g., 22). Thus, the configuration of the communication part 30 can be relatively freely changed. In this embodiment, since the outer surface 13b has a relatively large uneven shape, it is arranged on the vehicle interior side. Thus, the sound emitted from the vehicle interior 4 can be more appropriately absorbed and insulated. Thus, according to the present embodiment, sound emitted from a plurality of sound sources can be efficiently absorbed and insulated by a relatively simple configuration.

Second Embodiment

Regarding the elements of a sound absorbing and insulating structure 10A of the second embodiment that are substantially the same as those of the sound absorbing and insulating structure of the first embodiment, the details are omitted by adding corresponding reference symbols to them. The sound absorbing and insulating structure 10A shown in FIG. 8 has a first partition member 11, a second partition member 12, and a sound absorbing and insulating member 13A. These are basic configurations common with the first embodiment. The sound absorbing and insulating member 13A has a plurality of protrusions 15A, a bottom walls 14, and a plurality of communication parts 30A. The second embodiment is primarily different from the first embodiment in that the communication part 30A is provided at the ceiling wall 20 of the protrusion 15A.

Figure 8:
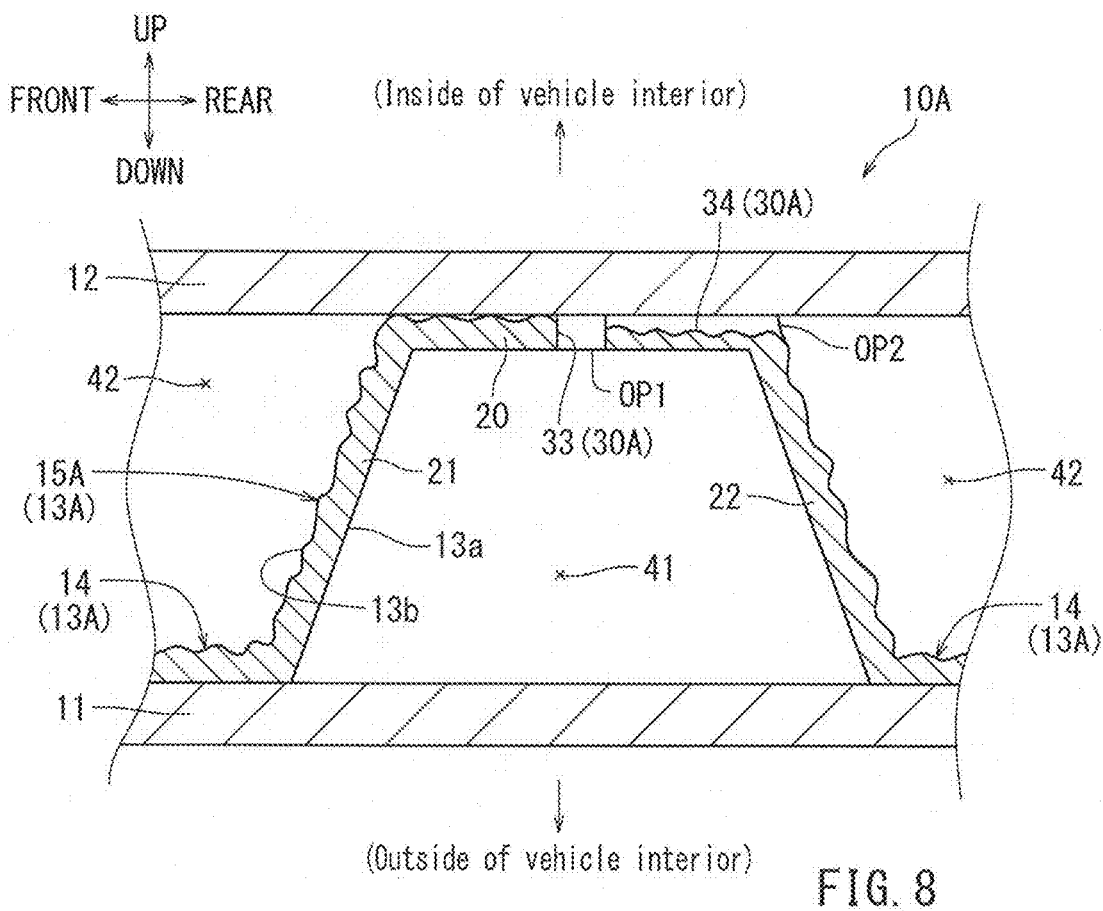
FIG. 8 is a schematic sectional view of a sound absorbing and insulating structure according to the second embodiment.
Figure 9:
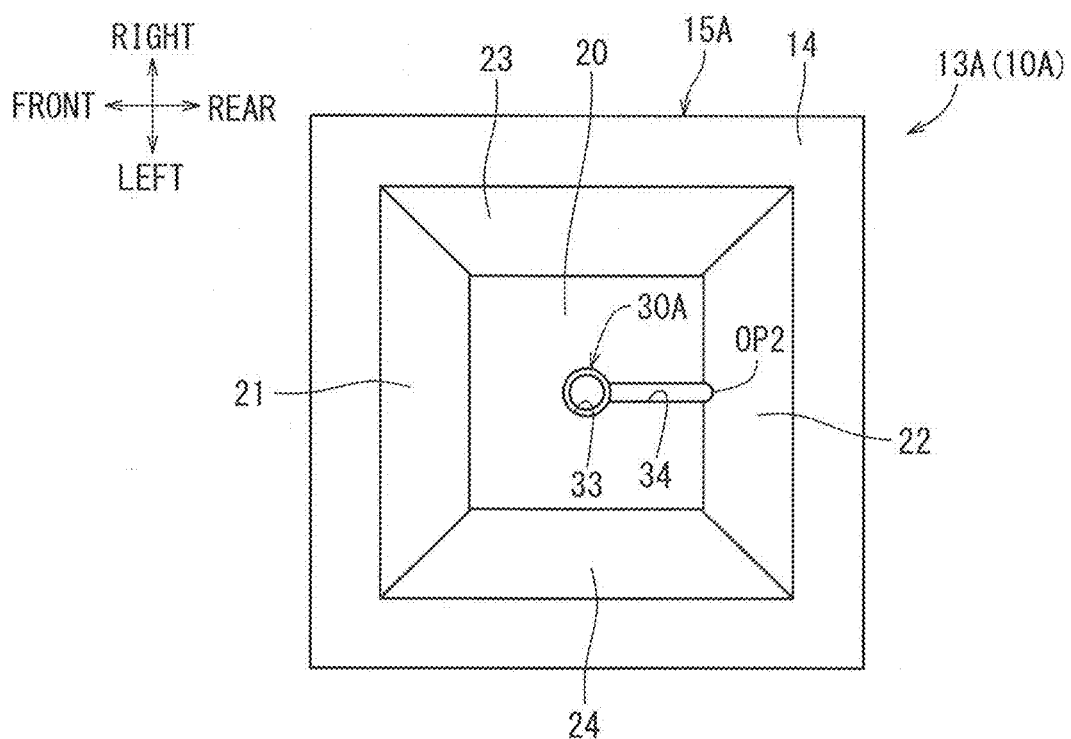
FIG. 9 is a top view of the sound absorbing and insulating member according to the second embodiment.

That is, the protrusion 15A shown in FIGS. 8 and 9 has a ceiling wall 20 forming an upper surface, four side walls (a front side wall 21, a rear side wall 22, a right side wall 23, a left side wall 24) forming peripheral surfaces, and a communication part 30A. The communication part 30A is provided at the ceiling wall 20, and has serially a first passage 33 and a second passage 34. The first passage 33 is a generally circular through hole penetrating the ceiling wall 20 in the thickness direction (vertical direction). A first opening OP1 opened to the first space 41 is provided at a lower end of the first passage 33. The second passage 34 is a groove-like recessed portion provided on an outer surface 13b of the ceiling wall 20. The second passage 34 extends generally linearly from the first passage 33 toward the rear side wall 22. A front end of the second passage 34 is connected to an upper end rear part of the first passage 33. The second opening OP2 is provided at a rear end of the second passage 34. The second opening OP2 is opened at a position facing the second space 42 at an upper edge of the rear side wall 22. The second opening OP2 is arranged above the first partition member 11 and below the second partition member 12. In this way, the first space 41 and the second space 42 also communicate each other via the communication part 30A, which opens at the rear side wall 22 in this embodiment. Thus, the communication part 30A can be prevented from being blocked by the partition members 11, 12.

In this embodiment, the configuration of the communication part 30A shown in FIGS. 8 and 9 can be relatively freely changed depending on the sound to be absorbed by adjusting positions and/or lengths of the first passage 33 and the second passage 34. For example, the length dimension of the communication part 30A may be increased in order to absorb low frequency sounds. In this case, the first passage 33 may be provided on a front side of the central position of the ceiling wall 20, so as to make the second passage 34 longer. In this way, the length dimension of the communication part 30A can be appropriately adjusted to be longer. Alternatively, the length dimension of the communication part 30A may be decreased in order to absorb high frequency sounds. In this case, the first passage 33 may be provided on a rear side of the central position of the ceiling wall 20, so as to make the second passage 34 shorter. As a result, the length dimension of the communication part 30A can be appropriately adjusted to be short. Thus, in the present embodiment, the configuration of the communication part 30A can be relatively freely changed by adjusting the positions and the lengths of the respective passages 33, 34 of the ceiling wall 20. Particularly in the present embodiment, even when the thickness dimension of the ceiling wall 20 (the length dimension of the first passage) is under certain restrictions, the length dimension of the communication part 30A can be relatively freely changed according to the sound to be absorbed. In this embodiment, although a single first passage 33 is provided as shown in FIG. 8, a plurality of first passages may be provided on the second passage. In this embodiment, although a single second passage 34 is provided as shown in FIG. 9, a plurality of second passages may be connected to the first passage.

Modified Embodiment

The sound absorbing and insulating member can take various configurations in addition to the above-described configuration. For example, in the above-described embodiment, a communication part having substantially the same configuration is provided in each protrusion. However, the configuration (length dimension, opening area, etc.) of the communication part can be changed for each protrusion. For example, the sound absorbing and insulating member can be provided with protrusions (normal protrusion) having configurations the same as that of each embodiment, and also have other protrusion. The other protrusion may have communicating parts that are shorter in the length dimension than that of the normal protrusion. In this way, the other protrusion may be configured to absorb relatively high frequency sounds. Alternatively or in addition, the other protrusions may have communicating parts that are longer in the length dimension than that of the normal protrusion. In this way, the other protrusion may be configured to absorb relatively low frequency sounds. Thus, the sound absorbing and insulating member may have a plurality of communication parts having different configuration for each protrusion, so that a wide range of sound frequencies can be absorbed.

TEST EXAMPLES

Figure 10:
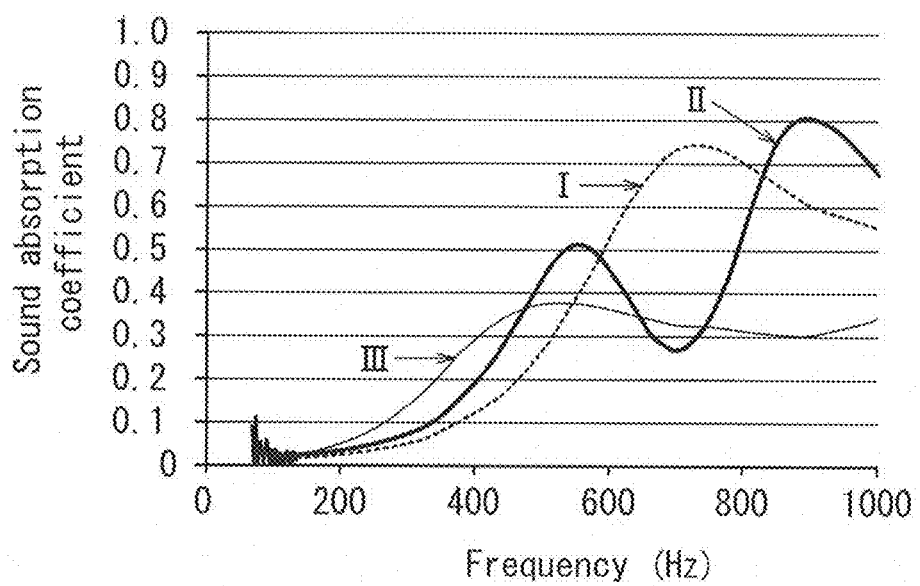
FIG. 10 is a graph showing a relationship between a sound absorbing coefficient and a frequency.
Figure 12:
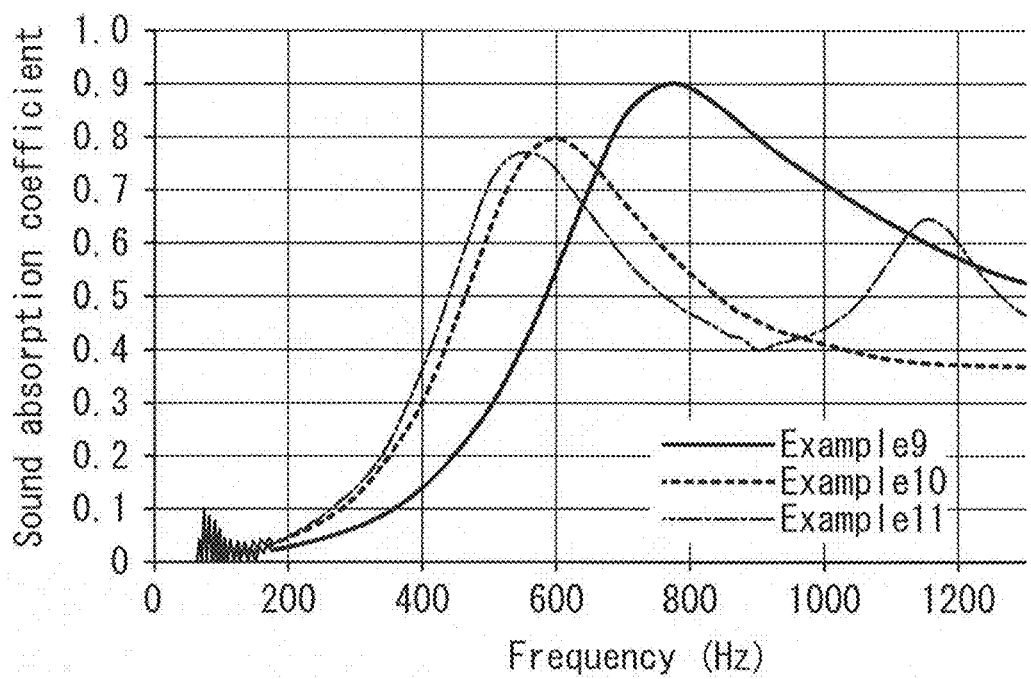
FIG. 12 is a graph showing a relationship between a length dimension of a communication part, the sound absorbing coefficient, and the frequency.
Figure 13:
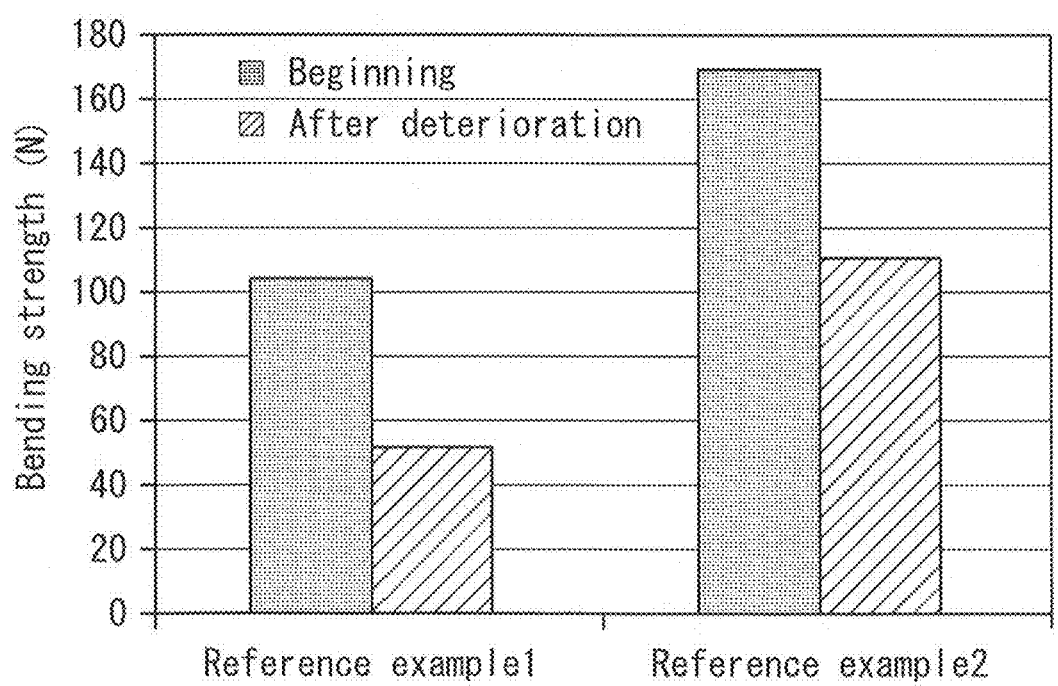
FIG. 13 is a graph showing a relationship between additives and bending strength.

Although the present embodiment will be described with reference to test examples, the present disclosure is not limited to the test examples. The following Table 1 shows effects of additives. Table 2 shows results of tests to determine whether the weight is reduced. FIG. 10 shows a graph showing results of sound absorption characteristic tests. In the graph of FIG. 10, a first sound absorption coefficient curve I and a second sound absorption coefficient curve II show measurement results of Example 1, and a third sound absorption coefficient curve III shows a measurement result of Comparative Example 1. FIGS. 11 and 12 show graphs showing results of the sound absorption characteristic test of Examples 2 to 11. FIG. 13 shows a graph showing a result of the evaluation test of the additives.

Example 1

The sound absorbing and insulating member of Example 1 was manufactured by pulp molding. A raw liquid was used in this manufacturing process. The raw liquid was a slurry where a predetermined amount of waste paper pulp was put into water. The sound absorbing and insulating member had a plate-like shape, as shown in FIGS. 2 to 5. A plurality of protrusions were provided at approximately equal intervals. Each protrusion was made to weight approximately 1 g. The internal volume (volume of the first space) of each protrusion was made to be 6 cm$^3$. A volume of the second space was set to be smaller than that of the first space. As shown in FIG. 5, a communication part was provided at a rear side wall of the protrusion. A length dimension of the communication part was set to 0.3 cm. The opening dimension of the passage part was set to 20 mm in diameter.

Examples 2 to 8

For the sound absorbing and insulating members of Examples 2 to 8, the number of communication parts (passage parts) was changed for each Examples. This allows for observing changes in the sound absorbing performance due to the opening ratio. In Examples 2 to 9, the sound absorbing and insulating member shown in FIG. 8 was used and was provided with three protrusions. Each protrusion was made to weight approximately 4 g. The inner volume (volume of the first space) of each protrusion was made to be 21.4 cm$^3$. The opening dimension of the passage part was made to be 3 mm in diameter. The other configurations in Examples 2 to 8 were the same as that of Example 1. In Example 2, each protrusion had one communication part. In Example 3, each protrusion had two communication parts. In Example 4, each protrusion had three communication parts. In Example 5, each protrusion had four communication parts. In Example 6, each protrusion had five communication parts. In Example 7, each protrusion had six communication parts. In Example 8, each protrusion had eight communication parts.

Examples 9 to 11

For the sound absorbing and insulating member of Examples 9 to 11, each length dimension of the communication part was changed in each Examples. This allows for observing changes in the sound absorbing performance due to due to the difference of the length dimension of the communication part. The other configurations of the sound absorbing and insulating member of Examples 9 to 11 were the same as that of Example 6 (having five communication parts). In Example 9, each of the five communication parts was provided with a passage part having an opening dimension of 3 mm in diameter, and a length dimension of each communication part was set to 2.5 mm. In Example 10, each of the five communication parts was provided with a passage part having an opening dimension of 3 mm in diameter, and a length dimension of each communication part was set to 5 mm. In Example 11, each of the five communication parts was provided with a passage part having an opening dimension of 3 mm in diameter, and a length dimension of each communication part was set to 7.5 mm.

Comparative Example

The sound absorbing and insulating member of Comparative Example 1 was provided with a through hole (20 mm in diameter), which corresponds to the communication part, only in its ceiling wall. The other conditions were substantially the same as that of Example 1.
[Sound Absorption Characteristic Test]
In the sound absorption characteristic test, a vertical incident sound absorption coefficient measurement device (Nittobo Acoustic Engineering Co., Ltd., WinZacMTX) was used. The measurement conditions were set to 100 to 1600 Hz/09.3 mm. The sound absorbing and insulating member of Example 1 was arranged on a measuring table in a state such that its ceiling wall side is directed upward. In this state, sound was emitted from above the sound absorbing and insulating member (corresponding to the inside of the vehicle interior), and its sound absorption coefficient was determined (see the first sound absorption coefficient curve I in FIG. 10). Further, the sound absorbing and insulating member of Example 1 was placed on the measuring table in a state that the sound absorbing and insulating member was turned upside down. That is, the ceiling wall was placed on the measuring table. In this state, sound was emitted from above the sound absorbing and insulating member (corresponding to the outside of the vehicle interior), and its sound absorption coefficient was determined (see the second sound absorption coefficient curve II in FIG. 10). Furthermore, the sound absorbing and insulating member of Comparative Example 1 was placed on the measuring table in a state such that the sound absorbing and insulating member was turned upside down. That is, the ceiling wall was placed on the measuring table. In this state, sound was emitted from above the sound absorbing and insulating member (corresponding to the outside of the vehicle interior), and its sound absorption coefficient was determined (see the third sound absorption coefficient curve III in FIG. 10). Also, the sound absorbing and insulating member of Examples 2 to 11 were each placed on the measuring table in a state such that their ceiling wall side was directed upward, and the sound absorption coefficient was determined under the conditions of 100 to 1600 Hz 499.3 mm.
[Evaluation Test of Additives (Reference Examples 1 to 4)]
In order to evaluate the effect of the additives, test pieces (vertical length: 40 mm, lateral length: 25 mm, and thickness dimension: 3 mm) of Reference examples 1 to 4 were prepared. The test pieces were prepared under the same conditions as that of Example 1. In Reference example 1, a raw liquid without additives was used. In Reference examples 2-4, the raw liquid included various additives. Specifically, the raw liquid of Reference example 2 included 3.3 wt. % of a dry paper strengthening agent, 4 wt. % of a wet paper strengthening agent, 1.0 wt. % of a sizing agent, and 0.5 wt. % of a pH adjuster. The raw liquid of Reference example 3 included 3.3 wt. % of a dry paper strengthening agent, 8 wt. % of a wet paper strengthening agent, 1.0 wt. % of a sizing agent, and 0.5 wt. % of a pH adjuster. The raw liquid of Reference example 4 included 3.3 wt. % of a dry paper strengthening agent, 12 wt. % of a wet paper strengthening agent, 3.3 wt. % of a sizing agent, and 0.5 wt. % of a pH adjuster. In this test, an anionic polyacrylamide resin (SEIKO PMC CORPORATION, product:DA 4104) was used as the dry paper strengthening agent, polyamide polyamine epichlorohydrin resin (SEIKO PMC CORPORA- TION, product: WS4020) was used as the wet paper strengthening agent, an AKD-based sizing agent comprising mainly an alkylketene dimer (SEIKO PMC CORPORATION, product: AD1639) was used as the sizing agent, and sodium hydrogen carbonate was used as the pH adjuster.

As an evaluation test of the additives, the bending strength of the test pieces of each Reference example was determined. In this test, a test machine for a three-point bending flexural test (SHIMADZU CORPORATION, product: AG-X) was used. The distance between fulcrums was set to 20 mm, and the head speed was set to 0.5 mm/min. Further, each test piece of Reference examples 1 and 2 was placed under an environment of 80 degrees C. and 95% RH for 400 hours, so as to be deteriorated. The bending strength was determined according to the above described method after deterioration.

Test to Determine Whether the Weight is Reduced (Reference Examples 5 and 6)

Figure 14:
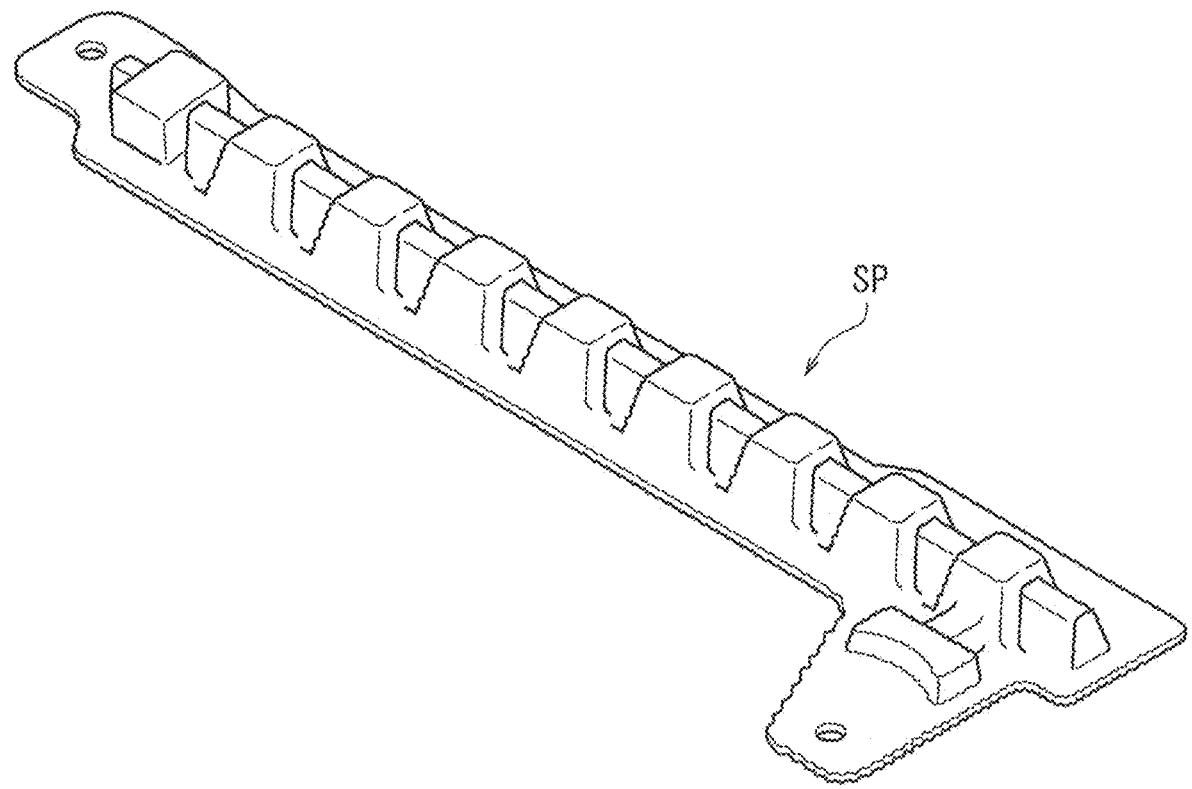
FIG. 14 is a perspective view of a test sample used in a light weight determination test.

We prepared test samples shown in FIG. 14 from different materials for a test to determine whether the weight of the test samples were reduced. The test sample is a plate-like member used as a protector for a wire harness. The test samples have a generally rectangular shape, as seen from above. The test samples are provided with hollow protrusions, which are arranged in parallel along their longitudinal direction. The test sample of Reference example 5 is a plate-like member made of polypropylene (PP). The test sample of Reference example 6 is made of a material in which cellulosic fibers are integrated in a laminated state, as in Example 1. The test sample of Reference example 6 is formed so as to have substantially the same rigidity (bending strength) as the test sample of Reference example 5 by adjusting its thickness dimension or the like. A weight reduction rate of the test sample of Reference example 6 was calculated by the following Equation 2. A specific gravity reduction rate of the test sample of Reference example 6 was calculated by the following Equation 3.

(Weight reduction rate)=((Weight of the test sample of Reference example 5)−(Weight of the test sample of Reference example 6))/(Weight of the test sample of Reference example 5)×100     Equation 2:

(Specific gravity reduction rate)=((Specific gravity of the test sample of Reference example 5)−(Specific gravity of the test sample of Reference example 6))/(Specific gravity of the test sample of Reference example 5)×100     Equation 3:

TABLE 1

|  | Reference example 1 | Reference example 2 | Reference example 3 | Reference example 4 |
|---|---|---|---|---|
| Dry paper strengthening agent (wt. %) | — | 3.30 | 3.30 | 3.30 |
| Wet paper strengthening agent (wt. %) | — | 4 | 8 | 12 |
| Sizing agent (wt. %) | — | 1.00 | 1.00 | 3.30 |
| PH adjuster (wt. %) | — | 0.50 | 0.50 | 0.50 |
| Average bending strength (N) | 104.8 | 169.7 | 177.4 | 189 |
| Average bending strength (N) after deterioration | 52 | 111.7 | — | — |

TABLE 2

|  | Material | Weight | Weight Reduction Rate | Specific gravity | Specific gravity reduction rate |
|---|---|---|---|---|---|
| Reference example 5 | Polpropyene | 98 g | — | 0.9 | — |
| Reference example 6 | Cellulosic fiber | 64 g | 35% | 0.41 | 54 % |

Test Results and Discussion

With reference to FIG. 10, the sound absorption coefficient curve (the first sound absorption coefficient curve I) was obtained for Example 1. When the ceiling wall side (corresponding to the inside of the vehicle interior) of the sound absorbing and insulating member is directed upward, the first sound absorption coefficient curve I has a sharp peak around 700 Hz, due to a sound absorbing effect of the first space. When the sound absorbing and insulating member of Example 1 was set upside down, the sound absorption coefficient curve (the second sound absorption coefficient curve II) having a sharp peak around 900 Hz was obtained due to the sound absorbing effect by the second space. This result is considered to be caused by the first space and the second space being in communication with each other through the communication part formed in the side wall of the protrusion. It is also believed that this is due to the opening of the communication part not being closed by a test table (which acts as the partition member in the test). Thus, we found that sounds emitted from different sound sources can be efficiently absorbed and insulated by a relatively simple configuration, for instance by the sound absorbing and insulating structure constituted with the sound absorbing and insulating member of the first embodiment.

With reference to FIG. 10, the sound absorbing and insulating member of Comparative Example 1 generally has a lower sound absorption coefficient, compared with the sound absorbing and insulating member of Example 1. Further, the sound absorbing and insulating member of Comparative Example 1 has a generally broad sound absorption coefficient curve (the third sound absorption coefficient curve III). Thus, the sound absorbing and insulating member of Comparative Example 1 is considered somewhat unsuitable for efficiently absorbing sound of a specific frequency. This result is thought to be due to the through hole formed in the ceiling wall being blocked by the test table. Just for reference, when a surface material made of felt having a thickness dimension of 13 mm was used, instead of the sound absorbing and insulating member, the sound absorption coefficient was lower than that of the sound absorbing and insulating member of Comparative Example 1. Additionally, the sound absorption coefficient curve of the felt surface material was generally broad.

With reference to FIG. 11, sound absorption coefficient curves having a sharp peak were obtained from the sound absorbing and insulating member of Examples 2 to 8. As a result of each embodiment, we found that the peak of the sound absorption coefficient curve can be shifted toward a high frequency region by increasing the number of the communication parts, so as to increase the opening ratio. Consequently, it is easily estimated that the peak of the sound absorption frequency can be made wider so as to absorb a wider range of sound frequencies by using a combination of protrusions having a different number of communication parts (opening ratios). We found that when the sound absorbing and insulating member is provided with a plurality of protrusions, the above-mentioned effect can be obtained by making the configuration of the communicating part different for e protrusions.

With reference to FIG. 12, sound absorption coefficient curves having a sharp peak were obtained from the sound absorbing and insulating member of Example 9 to 11. As a result of each embodiment, we found that the peak of the sound absorption coefficient curve can be shifted toward a low frequency region by increasing the length dimension of the communication part. As a result of the above, it is easily estimated that the peak of the sound absorption frequency can be made wider so as to absorb a wider range of sound frequencies by using a combination of protrusions having different length dimensions for the communication parts. We found that when the sound absorbing and insulating member is provided with the plurality of protrusions, the above-mentioned effect can be obtained by making the configuration of the communicating part different for at least some of the protrusions.

Referring to Table 1 and FIG. 13, comparing the test piece of Reference example 1 with the test pieces of Reference examples 2-4, we found that the average bending strength was improved by adding additives. Comparing the test pieces of Reference examples 1 and 2, we found that by adding the additives, the average bending strength was improved both before deterioration and after deterioration. Further, it is easily estimated that the water resistance of the test pieces of Reference examples 2 to 4 can be improved by adding a sizing agent to the test pieces of Reference examples 2 to 4, compared to Reference example 1. Thus, we found that various kinds of additives may be added to improve the performance of various characteristics of the sound absorbing and insulating member. With reference to Table 2, the weight and the specific gravity of the test sample of Reference example 6 was significantly reduced, compared with the test sample of Reference example 5. Thus, we found that a sound absorbing and insulating member made of cellulosic fibers has the same rigidity as that of a resin sound absorbing and insulating member, while also contributing to a reduction in weight.

The sound absorbing and insulating member of this embodiment is not limited to the above-described embodiments, and other various embodiments are available. In this embodiment, the configuration (shape, size, arrangement, arrangement number, etc.) of the sound absorbing and insulating structure 10 was exemplified. However, it is not intended to limit the configuration of the sound absorbing and insulating member of that embodiment. For example, a sound absorbing and insulating member functioning as a component of a vehicle may be installed on a vehicle body, including a floor, a ceiling, and a side wall of a vehicle interior, or installed on a part of an instrument panel, a pillar garnish, a console, a door trim, or any other component of the vehicle. The sound absorbing and insulating member may also be installed in a section or the like for partitioning the vehicle interior and another vehicle interior structure (such as a trunk space, an engine compartment, etc.). The first sound source and the second sound source may be separately disposed at the inside of the vehicle interior and the outside of the vehicle interior, respectively, or both of them may be disposed at the inside of the vehicle interior. Each partition member may constitute a part of a component of the vehicle, or may be different from that component. The shapes and/or sizes of the sound absorbing and insulating member and each partition member can be appropriately set depending on the use application (e.g., soundproof, reinforcement, raising, etc.) and/or the required sound absorbing performance and the sound insulating performance.

Although the configuration (shape, size, arrangement, number, etc.) of the protrusion 15 and the communication part 30, etc. were exemplified for the present embodiment, it is not intended to limit the configuration of these components. For example, the protrusion may have any of various three-dimensional shapes, such as a rectangular column shape (pillar shape) including a truncated square pyramid shape, a rectangular parallelepiped shape, a cubic shape, a cylindrical shape, a truncated cone shape, a hollow cylindrical shape, or a hemispherical shape. Each of the plurality of protrusions may have an individual shape and/or dimension. The sound absorbing and insulating member may be deformed by being bent and/or curved, according to the shape of each protrusion. The sound absorbing and insulating member may have at least one inclined side wall, so that its cross-section forms a hat cross-section. In this embodiment, only the rear side wall may be inclined. The side walls may be linearly inclined or bent and inclined like a staircase or the like. The side walls may be curved so as to form curved surfaces. A plurality of or a single communication part may be formed in each wall of the protrusion. For example, in the first embodiment, the communication part may be appropriately formed in the front side wall, the rear side wall, the right side wall, and/or the left side wall. The sound absorbing and insulating structure may have two or more first spaces and one or more second spaces. The volume of each of these spaces can be set independently. When a plurality of the second spaces are provided, a partition wall for partitioning the adjacent second spaces can be provided in the sound absorbing and insulating member. The second spaces can be partitioned by using a rib or the like provided on the partition member.

Although the method for manufacturing the sound absorbing and insulating member is exemplified in this embodiment, it is not intended to limit the manufacturing method. The sound absorbing and insulating structure of the present embodiment can be used for various structures, such as a house or a soundproof wall, as well as vehicle components, such as interior and/or exterior parts of a vehicle.

The invention claimed is:

1. A sound absorbing and insulating structure, comprising:
   a sound absorbing and insulating member, a first partition member provided between the sound absorbing and insulating member and a first sound source, and a second partition member provided between the sound absorbing and insulating member and a second sound source, wherein:
   the sound absorbing and insulating member is a plate-like member formed by being bent so as to be alternately brought into contact with the first partition member and the second partition member, the sound absorbing and insulating member having a plurality of hollow protrusions protruding so as to fill a gap between the first partition member and the second partition member,
   first spaces and a second space are formed between the first partition member and the second partition member,
   each of the first spaces being formed within a respective protrusion is closed by the first partition member,
   the second space provided between adjacent protrusions is closed by the second partition member,
   each of the first spaces is connected to the second space through a communication part formed as a part of each of the protrusions, each of the communication parts is configured to communicate an inside of the protrusion with an outside of the protrusion, an opening of each of the communication parts opened to the second space is provided at a side wall of the protrusion arranged between the first partition member and the second partition member, and wherein the sound absorbing and insulating member is made of a material in which a plurality of cellulosic fibers are integrated in a laminated state.

2. The sound absorbing and insulating structure according to claim 1 wherein:

each protrusion is a cylindrical portion having a hat cross-sectional shape and has a pair of opposed side walls; and one side wall of the pair of opposed side walls is provided with the opening of the communication part and is inclined so that the one side wall gradually separates from the other side wall in a direction from the second partition member to the first partition member.

3. The sound absorbing and insulating structure according to claim 1 wherein:

each protrusion has a plate-like ceiling wall contacting the second partition member in a state of being applied thereto, each communication part is provided at the corresponding ceiling wall, each communication part serially has a first passage and a second passage, each first passage extends in a thickness direction of the corresponding ceiling wall so as to communicate with the corresponding first space, and each second passage is formed in a groove-like shape in the corresponding ceiling wall and is opened to the corresponding sidewall.

4. The sound absorbing and insulating structure according to claim 1 wherein:

the first partition member, the second partition member and the sound absorbing and insulating member form a part of a vehicle;

the sound absorbing and insulating member is made of a material in which a plurality of cellulosic fibers are integrated in a laminated state, and an outer surface of the sound absorbing and insulating member located on a vehicle interior side of the vehicle is more uneven, as compared to an inner surface of the sound absorbing and insulating member located opposite to the outer surface.

5. A sound absorbing and insulating structure, comprising:

a sound absorbing and insulating member;

a first partition member provided between the sound absorbing and insulating member and a first sound source; and a second partition member provided between the sound absorbing and insulating member and a second sound source, wherein:

the sound absorbing and insulating member is a plate-like member alternately brought into contact with the first partition member and the second partition member, the sound absorbing and insulating member has a plurality of hollow protrusions protruding so that each protrusion traverses a gap between the first partition member and the second partition member, first spaces and a second space are formed between the first partition member and the second partition member, each of the first spaces being formed within a respective protrusion is closed by the first partition member, the second space provided between adjacent protrusions is closed by the second partition member, each of the first spaces is connected to the second space through a communication part formed as a part of each of the protrusions, each of the communication parts is configured to communicate an inside of the protrusion with an outside of the protrusion, an opening of each of the communication parts opened to the second space is provided at a first side wall of the corresponding protrusion arranged between the first partition member and the second partition member, each protrusion has a second side wall positioned opposite the corresponding first side wall, and at least a part of the first side wall has a thickness greater than that of the corresponding second side wall.

6. The sound absorbing and insulating structure according to claim 5, wherein:

each communication part has a second opening opened to the corresponding first space, and a distance between each second opening and the first partition member is less than a distance between each opening and the first partition member.

7. The sound absorbing and insulating structure according to claim 6, wherein a distance between each second opening and the second partition member is greater than a distance between each opening and the second partition member.

\* \* \* \* \*